United States Patent Office 3,314,159
Patented Apr. 18, 1967

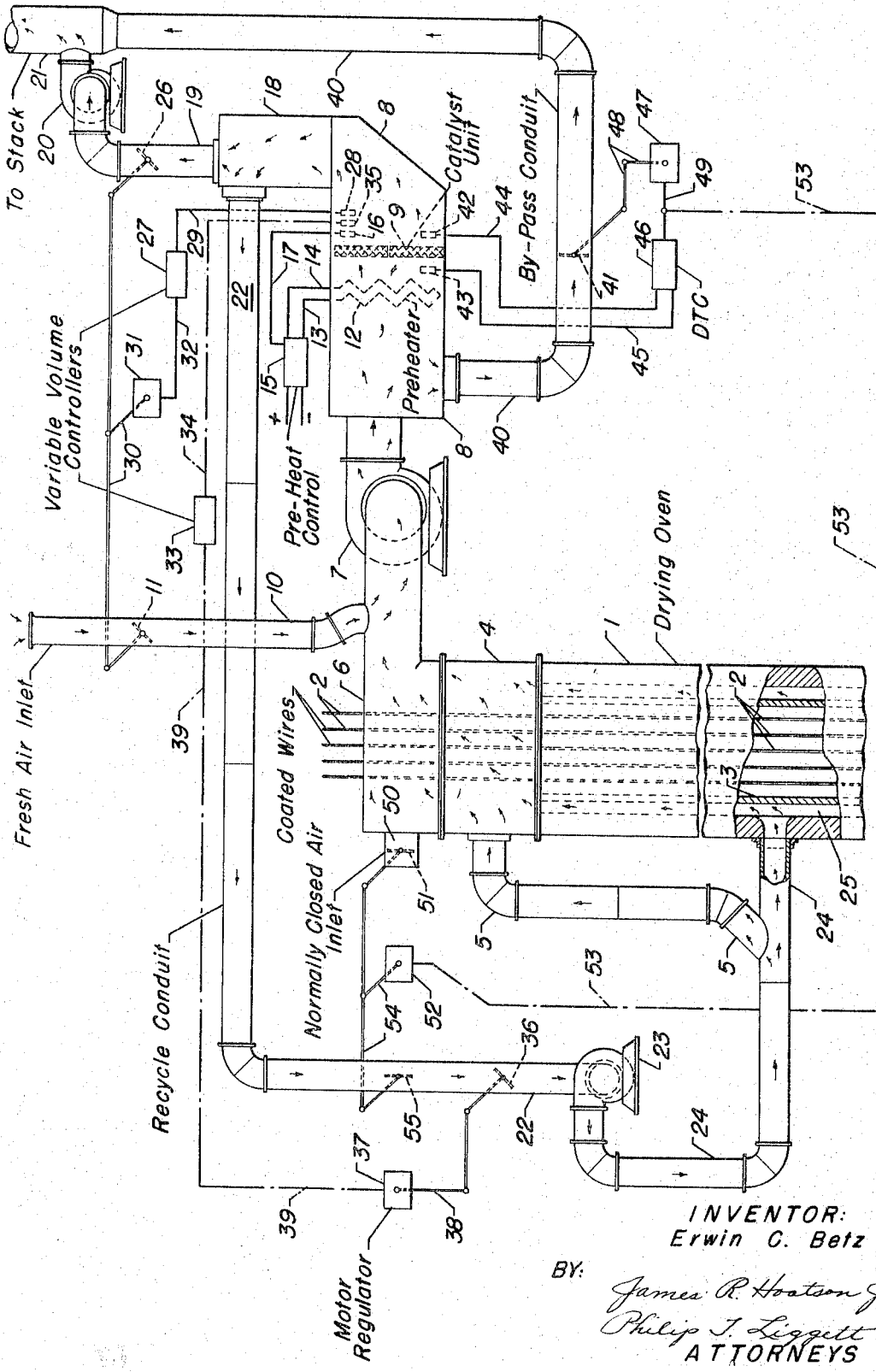

3,314,159
FUME TREATING SYSTEM FOR A DRYING OVEN
Erwin C. Betz, Gondsroth, Germany, assignor to Universal Oil Products Company, Des Plaines, Ill., a corporation of Delaware
Filed May 18, 1964, Ser. No. 368,049
6 Claims. (Cl. 34—72)

The present invention relates to a fume treating system for a drying oven and more particularly to a system adapted to collect and treat fumes from a vertical coating oven arrangement where the solvent vapors are not diluted with infiltrated air passing through at least a portion of the drying oven.

In connection with vapor collecting and treating systems, it is necessary to preclude condensation of the solvent vapors in the zone of the oven outlet as well as the entire upstream path to the incinerating or treating zone. The ejected fumes must also be diluted rapidly at the oven outlet and ahead of the treating zone to a level below their lower explosive limit. Thus, where cool air is infiltrated to dilute the vapors there is a problem of condensation which may render the oven inoperable. In addition, the cool air infiltration requires the utilization of substantial heat energy to increase its temperature to a drying level.

It is thus a principal object of the present invention to provide a solvent vapor treating system for a drying oven which utilizes a hot recycle carbon dioxide rich stream to effect the dilution of the vapors at the oven outlet and the prevention of vapor condensation.

It is a further object of the present invention to provide a duel introduction of recycle gases into the oven zone whereby at least a portion of the hot gases are used at the outlet of the oven in a vapor collecting hood to provide dilution of the vapor stream, and another portion of the hot recycle gases is passed to the zone of the oven heating compartments to provide supplementary heat thereto.

Broadly, the present invention provides a system for treating vaporous fumes from a vertical drying oven in a manner which comprises the steps of collecting the fumes from the oven in a confined zone and diluting such fumes with hot carbon dioxide stream which is obtained as hereinafter set forth, subsequently admixing air with the diluted fume stream and passing the mixture at an elevated temperature and at oxidizing conditions into contact with an oxidation catalyst at conditions in a treating zone to thereby effect the oxidation and elimination of the combustible fumes in such stream, effecting the withdrawal of at least a portion of the resulting oxidized stream from the catalytic treating zone and recycling such stream to the collection zone at the outlet of the oven to provide said hot carbon dioxide rich stream, withdrawing an additional portion of hot carbon dioxide rich treated stream and introducing such portion into the heating zone of the oven whereby additional heat is supplied to the latter to reduce the heat input load for the drying of the coated material passing through the oven and discharging to the atmosphere a remaining unused portion of the treated gas stream passing from the catalyst treating zone.

The present system may be adapted to various drying oven designs; however, it is particularly adapted to use with a vertical oven arrangement of the type effecting the drying of coated material in the absence of oxygen. For example certain ovens utilize roll-on enamel application means or have the inlet portion of the drying oven immersed into an enamel bath such that there is a complete sealing off of the inlet portion of the drying oven. Thus, where wire or other coated material is passed through the oven the solvents evaporate and fill the heating chamber causing a high concentration of solvent vapors in the oven chamber in the absence of oxygen. However, with the continuous evaporation of solvent there is a slight positive pressure in the oven chambers, with the fumes being gradually pushed out the top outlet portion of the oven. Thus, at this outlet portion, it is necessary to immediately introduce fresh air or, in accordance with the present invention, introduce a carbon dioxide rich stream as the diluting medium such that there will be no heavy condensate formation at the oven outlet where an accumulation could render the oven inoperable. The oven chambers are generally heated with electrical resistance coils or other infra-red heat generating means providing high temperature drying conditions suitable for the various types of enamels which may be polymerized or set in the substantial absence of oxygen. In a preferred arrangement of the present system, at least a portion of the hot recycle treating gas stream is also brought back to the zone of the heating chamber such that there may be a reduction in the heat losses from the unit.

In an apparatus embodiment, the present invention provides a fume treating system for use with a vertical drying oven arrangement which comprises in combination, a fume collecting hood positioned above the fume outlet from the drying oven, duct means connecting said collecting hood with a catalytic oxidizing chamber having a fume path therethrough, catalytic fume incinerating means positioned in the oxidizing chamber across the fume path therethrough, air inlet means connecting to said duct means ahead of said oxidizing chamber, conduit means connecting from said oxidizing chamber to outlet stack means, recycle conduit means connecting between said conduit means and said fume collecting hood providing for a carbon dioxide rich stream to the latter, circulating fan means connected in combination with said conduit means and said oxidizing chamber providing fume flow therethrough, additional circulating fan means connected in combination with said recycle conduit means, and adjustable damper means positioned in combination with each of said conduit means and in said air inlet means providing regulation of air to said oxidizing chamber and the regulation of hot recycle carbon dioxide gas to said collecting hood.

In a preferred embodiment, additional conduit or duct work means may be provided to introduce at least a portion of the hot recycle carbon dioxide rich stream into the body of the oven such that additional hot gases will be utilized to encompass the oven heating zone and reduce heat losses therefrom.

In still another embodiment, bypass duct means and damper means may be provided to effect bypassing of the entire diluted fume stream from the catalytic conversion zone where there is a failure of the catalyst to sustain oxidation of the combustible materials. Thermocouples or other heat sensitive elements may be positioned both upstream and downstream from the catalyst units to in turn connect with differenial temperature control means which will operate the damper means responsive to improper low temperature differential across the catalyst units. In other words, the bypass duct means is maintained normally closed by the damper under continuous catalytic oxidation conditions being sustained in the system, but such damper means will be operated to open responsive to the failure of the catalyst units to sustain continued oxidation of combustible materials and maintain a desired differential temperature level across the catalyst. A normally closed additional fresh air inlet means may also be provided at the zone of the fume collection hood from the drying oven such that fresh air may be rapidly introduced into admixture with the solvent vapors upon the operation of the bypass duct means and the failure of the catalyst unit to show the proper temperature differential in effecting oxidation of the combustibles.

Also, in preferred constructions, regulating dampers or variable volume control dampers may be positioned and utilized in combination with the normal fresh air inlet, the fume passageway means and the recycle conduit means such that balanced flows are maintained in the system responsive to the quantities of vaporous fumes being treated in the system and to temperature levels of the exhaust gas stream at a point downstream from the catalytic oxidation units.

The construction and operation of the present improved system, as well as additional advantageous features in connection therewith, may be better described and set forth by reference to the accompanying drawing and the following description.

Referring now specifically to the drawing, there is shown a vertically positioned drying oven 1 adapted to accommodate, for example, coated wire 2 being drawn through an internal heating chamber 3 and an upper fume collecting hood 4. The oven, indicated diagrammatically, is of a type discharging concentrated solvent vapors from the heating zone in the absence of air or oxygen, such that all of the vapors push up from the drying zone in a relatively slow flow along with the direction of movement of the coated wire or other material. In accordance with the present invention, a duct 5 connects with the hood 4 to provide for the introduction of a carbon dioxide rich recycle gas stream into admixture with the solvent vapors. This carbon dioxide stream is introduced in an amount sufficient to bring the resulting mixed stream to a point below the lower explosive limit as a safety factor. A mixed stream then passes by way of duct 6 and circulating fan 7 to a treating chamber 8 which in turn holds catalyst units 9 in the stream path to effect catalytic oxidation of the combustible components from the oven. Fresh air, to provide oxygen for the catalytic combustion, is brought into admixture with the carbon dioxide-solvent vapor stream ahead of the treating chamber 8 by way of an inlet duct 10 having a control damper 11. For start up purposes, or to insure an adequate temperature level for catalytic oxidation of combustibles, there is provided a preheating means 12 within treating chamber 8. The present drawing indicates diagrammatically the use of a preheater coil 12 receiving electrical energy by way of lines 13 and 14 from controller 15. The latter in turn supplies current to the coil responsive to thermocouple or other temperature sensitive element 16 at the zone of the catalyst units 9 and being connected by way of line 17.

It should be understood that the present drawing is diagrammatic and that the circulating fan or blower means 7 and the duct work 6 may be combined within treating chamber 8 or within the collection hood 4. Alternatively, the entire collection hood 4 and treating chamber section 8 may be integrated within one enlarged housing. In other words, suitable partition means may be provided within a single unitary chamber to provide for the collection and transmission of the gaseous streams to the catalytic treating section and for the discharge therefrom.

The resulting treated vapor stream, after passing through the catalytic oxidizing units 9 in chamber 8 to have the hydrocarbon content converted to carbon dioxide and water, is discharged from the chamber by way of outlet manifold 18 which in turn discharges a portion of the treated gas stream by way of duct 19, circulating fan 20 and duct means 21 to a suitable outlet stack, not shown. In addition, manifold 18 discharges a portion of the resulting carbon dioxide rich treated fume stream into duct 22 which returns such portion by way of circulating fan 23 and duct 24 to the drying oven zone. A portion of the recirculated treated stream is carried from recycle duct 24 by way of conduit 5 that connects with the collecting hood 4 to provide hot carbon dioxide dilution of the fumes from the drying chambers 3, as hereinbefore noted. Also, in accordance with the preferred embodiment of the present invention, a portion of the hot recycle gas stream is introduced directly into the body of the drying oven to provide additional heat therefor. The end of duct 24 is indicated diagrammatically as communicating with an annular section 25 which encompasses the drying zone 3 of the oven 1 to thus provide a hot recycle gas flow in an indirect heat exchange relationship therewith. The hot carbon dioxide rich stream from the section 25 in the body of the oven 1 is shown to discharge into the collecting hood 4 such that this portion of the recycle stream is also available along with the gas stream from duct 5 to effect dilution of the vapors being discharged from the heating and drying section of the oven.

The present arrangement is of particular advantage in eliminating the need to infiltrate air into the drying sections of the oven 1 and at the same time there is a substantial saving of heating in the input to the effect that infiltrated air normally requires a substantial amount of preheating to preclude condensate formation. Further, there is an advantage in utilizing a hot treated recycle stream for direct introduction into the collecting hood 4 to provide a substantially large quantity of diluting gas that serves to lower the explosive limit of the solvent vapor issuing from the drying sections and the immediate carrying away of a mixed gas stream under controlled conditions to a treating zone such that condensate is not permitted to collect directly above the oven discharge section.

In order to maintain a balanced operation in the system, a preferred embodiment utilizes automatic movable damper means at various critical control points. For example, in order to provide adequate fresh air introduction into the system to sustain substantially complete oxidation of the combustible components in the treating zone, there is the control damper 11 in the fresh air inlet duct 10 which works in parallel with a control damper 26 within outlet duct 19 by means of a suitable motor regulator 31 and variable volume controller 27. The latter in turn functions responsive to a thermocouple or other temperature sensitive means 28 connecting by way of line 29. Thus, the air inlet is adjusted directly responsive to temperature levels sustained directly downstream from the catalyst units 9. The volume controller 27 is shown connecting by means of line 32 with the motor regulator 31 and the latter to dampers 11 and 26 through linkage means 30.

In still another control arrangement there is a variable volume controller 33 which is connected through line 34 to a temperature sensitive element 35 that is positioned adjacent to and downstream from the catalyst units 9 such that there may be variable control of a damper 36 in the recycle conduit 22. The control damper 36 is normally open, as indicated diagrammatically, and variably controlled by way of motor regulator 37 having linkage means 38. The regulator 37 connects through line 39 with controller 33.

The preferred control system also embodies a vapor bypass arrangement such that upon the failure of the catalyst units to effect the desired level of substantially complete oxidation of combustibles in the fume stream there will be a further dilution of the solvent vapors from the oven by the addition of fresh air from an auxiliary inlet and the bypassing of the entire mixture to the stack by way of conduit 21. The present drawing indicates diagrammatically the use of a bypass duct 40, having a normally closed damper 41, therein, and connective with duct 21. The latter, as hereinbefore noted, connects with a suitable outlet stack. A pair of thermocouples or other temperature sensitive elements 42 and 43 are placed within the treating chamber 8, one on each side of the catalyst units 9, and connect by way of lines 44 and 45 to a differential temperature controller 46 to provide automatic means for registering the effectiveness of the catalyst units 9 in maintaining a sustained activity, with catalytic oxidation of combustibles as they pass through the elements. Normally, a predetermined temperature differential indicated between thermocouples 42 and 43 will operate through differential temperature controller 46 and line 49 to maintain the motor regulator 47 and linkage means 48 in a position whereby damper 41 is in a closed position. Conversely, temperature differential which is below a predetermined limit will operate temperature controller 46 and motor regulator 47 to effect the opening of damper 41 in the bypass conduit 40 whereby the entire diluted vapor stream passes from the treating chamber 8 directly to the stack means by way of conduit 21. At the same time that the bypass 40 is brought into operation by the adjustment of damper 41, there is provided for additional fresh air introduction into the vapor stream at the zone of the collection hood 4 and duct 6 by way of inlet 50 having control damper 51. The latter is maintained in a normally closed position across inlet duct 50 except by way of the operation of differential temperature controller 46 which simultaneously operates damper 41. There is indicated diagrammatically in the present drawing the use of a motor regulator 52 connecting through line 53 and line 49 with differential controller 46 to effect the movement of normally closed valve 51 by suitable linkage means 54. Simultaneously motor regulator 52 and linkage means 54 connect to and operate an auxiliary, normally open damper 55 in duct 22 to effect the stoppage of the recycle gas flow to the drying oven zone. In other words, under normal operating conditions the damper 55 is maintained in an open position; however, upon the failure of the catalytic oxidation units to provide a sustained temperature differential in the treating chamber 8, there will be a stoppage of the recycle flow and the introduction of fresh aid through inlet simultaneously with a bypassing of the entire air diluted fume stream from a point upstream of the catalyst directly to the stack means.

It is again pointed out that the arrangement of the present drawing is merely diagrammatic, in that various modifications within the scope of the present invention utilizing hot carbon dioxide rich treated gas streams in recycling flows to the drying oven. For example, there may be modifications as to the duct work or in the design and arrangement of the collection hood and treating chamber, as well as other forms of damper control means to close off or regulate quantities of gas flow in any particular conduit or passageway. In addition, there may be varying locations of the recirculation fans which maintain the desired continuous movement of vapors and gases in the system. It is, however, a particular feature of the improved system to utilize at least a portion of the hot carbon dioxide rich recycle stream flow directly into a fume collecting hood or section in such a manner that the hot gas flow is across the vapor discharge ports from the drying chamber of the oven and a preclusion of heavy condensation. Secondly, there is an improved operation and economic advantage obtained by the introduction of at least a portion of the hot recycle stream to the zone of the drying oven chambers such that there is a reduction in heat losses from the drying oven itself. The latter stream may be introduced directly into the drying chamber or may be passed in indirect heat exchange relationship therewith and thus passed in a separate annular pathway to the outlet zone of the drying oven to commingle with the solvent vapors and with the separate carbon dioxide rich stream which is introduced to the collecting hood as a hot gas diluent stream.

I claim as my invention:

1. a fume treating system for use with a vertical drying oven which comprises in combination:
   (1) a fume collecting hood positioned above the fume outlet from said drying oven;
   (2) duct means connecting said collecting hood with a catalytic oxidizing chamber having a fume path therethrough;
   (3) catalytic fume incinerating means positioned in said oxidizing chamber in the fume path therethrough;
   (4) air inlet means connecting to said duct means ahead of said oxidizing chamber and downstream from said fume collecting hood;
   (5) conduit means connecting from said oxidizing chamber to outlet stack means;
   (6) recycle conduit means connecting between said conduit means and said fume collecting hood and having a first normally open damper means positioned therein;
   (7) bypass conduit means connecting between said duct means and said outlet stack means and having a second normally closed damper means positioned therein;
   (8) additional air inlet means connecting directly with said collecting hood and having a third normally closed damper means positioned therein; and
   (9) temperature sensitive means placed in combination with said catalytic oxidizing chamber in a position sensitive to temperature changes both upstream and downstream of said catalytic fume incinerating means in said chamber, said temperature sensitive means being operatively connected through automatic damper regulator means to said first, second and third damper means whereby, responsive to failure of said incinerating means to effect catalytic oxidation of the fumes therethrough, said first damper means is closed and said second and third damper means are opened.

2. A fume treating system for use with a vertical drying oven constructed and operated to exclude oxygen therefrom which comprises in combination:
   (1) a fume collecting hood positioned above the fume outlet from said drying oven;
   (2) duct means connecting said collecting hood with a catalytic oxidizing chamber having a fume path therethrough;
   (3) catalytic fume incinerating means positioned in said oxidizing chamber in the fume path therethrough;
   (4) air inlet means connecting to said duct means ahead of said oxidizing chamber and downstream from said fume collecting hood;
   (5) conduit means connecting from said oxidizing chamber to outlet stack means;
   (6) recycle conduit means connecting between said conduit means and said fume collecting hood and having a first normally open damper means positioned therein;
   (7) additional air inlet means connecting directly with said collecting hood and having a second normally closed damper means positioned therein; and
   (8) temperature sensitive means in said catalytic oxidizing chamber operatively connected through automatic damper regulator means to said first and second damper means whereby, responsive to failure of said incinerating means to effect catalytic oxidation of the fumes therethrough, said first damper means is closed and said second damper means is opened.

3. A fume treating system for use with a vertical drying oven constructed and operated to exclude oxygen therefrom which comprises in combination:
   (1) a fume collecting hood connecting with and positioned above a fume outlet from said drying oven;
   (2) duct means connecting said collecting hood with a catalytic oxidizing chamber having a fume path therethrough;
   (3) catalytic fume incinerating means positioned in said oxidizing chamber in the fume path therethrough;

(4) air inlet means connecting to said duct means ahead of said oxidizing chamber and downstream from said fume collecting hood;
(5) conduit means connecting from said oxidizing chamber to outlet stack means;
(6) recycle conduit means connecting between said conduit means and said fume collecting hood and having a first normally open damper means positioned therein;
(7) additional air inlet means connecting directly with said collecting hood and having a second normally closed damper means positioned therein;
(8) additional recycle conduit means connecting between said conduit means and said drying oven whereby to provide additional hot gas heating within such oven;
(9) circulating fan means in combination with said duct means and said conduit means providing fume flow therethrough to said stack means;
(10) additional circulating fan means in combination with said recycle conduit means providing for the recirculation of treated fumes to said hood and said drying oven;
(11) temperature sensitive means in said catalytic oxidizing chamber operatively connected through automatic damper regulator means to said first and second damper means whereby, responsive to failure of said incinerating means to effect catalytic oxidation of the fumes therethrough, said first damper means is closed and said second damper means is opened.

4. The fume treating system of claim 3 further characterized in that said additional recycle conduit means connecting with said drying oven discharges into a heat exchange zone encompassing the drying chamber of said oven, whereby said additional hot gas heating effects indirect heat exchange therein.

5. The fume treating system of claim 3 further characterized in that preheat means is positioned within said duct means upstream from said catalytic fume incinerating means to provide start up heat for said fume oxidizing chamber.

6. A fume treating system for use with a vertical drying oven constructed and operated to exclude therefrom which comprises in comprises in combination:
(1) a fume collecting hood positioned above the fume outlet from said drying oven;
(2) duct means connecting said collecting hood with a catalytic oxidizing chamber having a fume path therethrough;
(3) catalytic fume incinerating means positioned in said oxidizing chamber in the fume path therethrough;
(4) air inlet means connecting to said duct means ahead of said oxidizing chamber and downstream from said fume collecting hood;
(5) conduit means connecting from said oxidizing chamber to outlet stack means;
(6) recycle conduit means connecting between said conduit means and said fume collecting hood and having a first normally open damper means positioned therein;
(7) bypass conduit means connecting between said duct means and said outlet stack means and having a second normally closed damper means positioned therein;
(8) additional air inlet means connecting directly with said collecting hood and having a third normally closed damper means positioned therein; and
(9) temperature sensitive means in said catalytic oxidizing chamber operatively connected through automatic damper regulator means to said first, second and third damper means whereby, responsive to failure of said incinerating means to effect catalytic oxidation of the fumes therethrough, said first damper means is closed and said second and third damper means are opened.

References Cited by the Examiner

UNITED STATES PATENTS

| | | | |
|---|---|---|---|
| 2,658,742 | 11/1953 | Suter et al. | 263—8 |
| 2,691,830 | 10/1954 | Karnofsky | 34—27 |
| 2,720,710 | 10/1955 | Erisman | 34—79 |
| 2,743,529 | 5/1956 | Hayes | 34—72 |
| 2,750,680 | 6/1956 | Houdry et al. | 363—3 |
| 2,795,054 | 6/1957 | Bowen | 34—72 |
| 3,106,386 | 10/1963 | Harris | 266—3 |

MARTIN P. SCHWADRON, *Primary Examiner.*

FREDERICK L. MATTERSON, Jr., B. L. ADAMS, *Assistant Examiners.*